INVENTOR.
CLARENCE E. CHRISTOPHERSEN
BY
J. Edwin Coates
ATTORNEY

Patented Feb. 13, 1951

2,541,205

UNITED STATES PATENT OFFICE 2,541,205

CLAMP

Clarence E. Christophersen, Los Angeles, Calif., assignor to Marman Products Company, Inc., Inglewood, Calif.

Application November 3, 1947, Serial No. 783,647

3 Claims. (Cl. 285—129)

This invention relates to a band clamp and more particularly to a clamp adapted to encircle and grip a pair of tubular or cylindrical members in such manner as to force them axially into engagement with each other. One such use, for example, is in clamping adjacent ends of a pair of pipes and forcing them into end abutting relation with each other to produce a fluid tight joint.

Clamps for this general purpose are already known and they range from extremely simple varieties to those which are highly complicated and relatively costly. One of the simpler and fairly satisfactory types comprises a generally channel shaped strip formed into a circle with perforated ears at or near the ends of the strips for the reception of clamping bolts, the walls of the channel being adapted to engage annular shoulders on pipe ends to hold them in abutting relation. In order to provide a tight joint, both the shoulders and the flanges of the channel are sloped or angled so that radial compressive force produced by tightening of the band will produce axial or longitudinal forces to urge the pipes into tight endwise engagement.

The reactions to these longitudinal forces tend to urge the flanges of the band outwardly, or flatten it. Such flattening thruout most of the length of the band is prevented by the circumferential tension set up by the clamping bolt but the free ends of the band are not so restrained and therefore tend to flatten out. This flattening reduces the axial clamping force near the ends of the band with a consequent decrease in the effectiveness of the joint.

The present invention overcomes this defect in prior art clamps by providing a simple and economical means for reinforcing the ends of the bands to prevent spreading or deformation. As disclosed in the accompanying drawing, this reinforcement is accomplished with a minimum of additional material and weight and has the added advantage of strengthening the ear engaged by the clamping bolt.

The invention generally consists in providing an outwardly extending ear for engagement with a clamping bolt or other fastener, the ear being integral with a short circumferentially extending portion which is permanently attached to the band near its free end, together with a flat plate-like element integral with the ear and having its inner free edge cut away to conform to the shape of the adjacent portion of the band. Any spreading tendency of the channel shaped band at this point is resisted by the bending strength of the plate-like element in its own plane. Thus a small amount of material makes the free end of the band almost as stiff and strong as if it were formed from a solid block with a channel cut in one face.

The presently preferred form of the invention is illustrated in the accompanying drawing in which.

Figure 1:
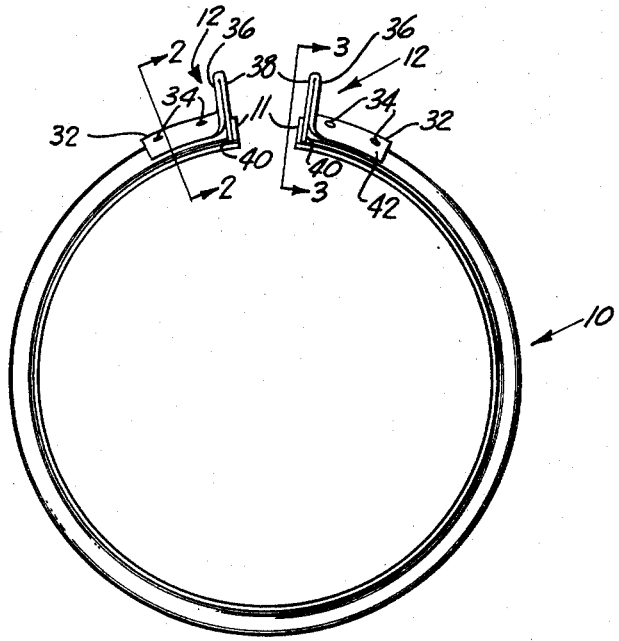
Figure 1 is a side elevational view of the clamp in open position.
Figure 4:
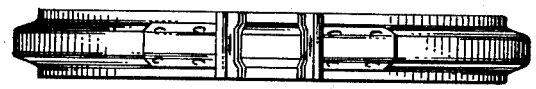
Figure 4 is a top plan view of the clamp of Figure 1.
Figures 2, 3:
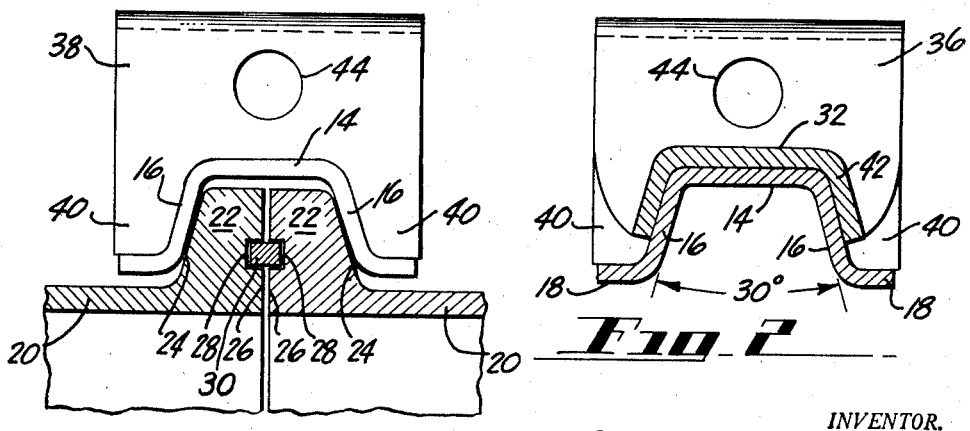
Figure 2 is a sectional view taken on the line 2—2 of Figure 1.
Figure 3 is an elevational view of a free end of the clamp, taken on line 3—3 of Figure 1, with a fragmentary section of a pair of pipes to be joined thereby.

The general configuration of the clamp is illustrated in Figure 1, in which the channel shaped band is generally indicated by the reference numeral 10. In the form shown, the band is provided at each free end 11 with a fastener engaging element 12. The band, referring to Figures 2 and 3, is generally channel shaped and includes a web portion 14 and a pair of diverging wall portions or flanges 16, 16 making an included angle of approximately thirty degrees. The free edges of the flanges are further provided with laterally extending reinforcing portions 18, 18, which latter may be omitted in the case of light duty clamps.

As an illustration of the manner of use of the clamp a pair of pipe ends 20, 20 is shown in Fig. 3, said pipe ends each being provided with a shoulder 22 having a sloping wall 24 conforming to the flange 16 and a planar end face 26 in which an annular groove or channel 28 is formed to receive part of the gasket 30. It will be readily apparent that circumferential tension in the band will cause radial constriction, and contact of the flange 16 with wall 24 will then produce an axial or longitudinal force on each pipe end 20. The faces 26, 26 will be forced together, compressing gasket 30 to form a liquid tight seal.

The circumferential tension existing in the major portion of the band will prevent the flanges 16 from spreading more than a negligible amount but, as the free ends 11 are approached, this force becomes less and less and the extreme ends, in the absence of the present invention, will spread out in response to the axial forces exerted thereon. The novel construction hereinafter described prevents such spreading.

Each fastener engaging element 12 comprises a first arcuate portion 32 lying along a portion of the periphery of the band and secured thereto preferably by spot welding as indicated at 34, a second portion 36 extending radially outwardly, and a third reversely bent portion 38 extending radially inwardly.

The plate-like element 38, as best shown in Figure 3, is cut away at its inner edge to conform substantially exactly with the shape of the channel band 10, providing a bifurcated portion having opposed legs 40. When flanges 16 tend to spread out they apply bending forces to legs 40 but, since these forces are in the plane of element 38, the strength and rigidity of the legs 40 are far greater than any force that can be applied by the flanges 16, and the combination of element 38 and band 10 is practically the equivalent of a solid block. The element 38, being integral with portion 36 and having its free end in solid engagement with the band, serves as an effective brace to resist deformation of portion 36 under the bending influence of a clamping bolt.

It will be noted in Figure 2 that the arcuate portion 32 includes depending flanges 42 which serve as doublers for the portions of flanges 16 adjacent to the free ends. The result of the combination of parts described is a practically uniform resistance to spreading thruout the length of the channel band 10.

Apertures 44 are provided for the reception of a clamping bolt, not shown, which draws the clamp into a final position in which the free ends of the band are closely adjacent.

While two identical fastener engaging elements are shown, it is contemplated that under some circumstances one of them will be replaced with a different type of element adapted for various special installations.

It will be seen from the above that I have provided a clamp of maximum simplicity, high strength, and uniform clamping characteristics.

While I have shown the presently preferred embodiment of the invention in the accompanying drawing it will be obvious to those skilled in the art that various modifications may be made without departing from its spirit or scope and it is intended that all such modifications shall be embraced within the scope of the following claims.

I claim:

1. In a band clamp having a resilient band formed substantially into a circle and having its free ends adapted to lay adjacent to each other in clamping position, said band in cross-section having the shape of an inwardly opening channel having diverging side walls adapted to bear upon similarly angle surfaces of a pair of members to be joined and to exert axially compressive force thereupon, upon radial constriction of said band: a fastener engaging element secured adjacent each free end for radially constricting said band; and means for reinforcing the free ends of said band comprising, a plate-like member carried by each fastener engaging element, said member extending radially inwardly from said element into engagement with the contiguous end portion of the band, the inner free end of each plate-like member being formed with an indentation to closely receive the channel-shaped band to prevent deformation thereof when said band is radially constricted.

2. In a band having a resilient band of channel-shaped material formed substantially into a circle with said channel opening inwardly for engagement with corresponding surfaces of a pair of members adapted to be forced into axial engagement by radial constriction of said band: a fastener engaging element mounted on each free end of said band for radially constricting the same; and a reinforcing member for strengthening the free ends of said band, said member comprising a portion of said fastening engaging element reversely bent upon itself and forming an inwardly extending portion at least as wide as said band and having an end face thereof closely embracing and reinforcing said channel-shaped band adjacent its extremity to prevent deformation thereof under load.

3. In a band clamp comprising a resilient band of channel-shaped material formed substantially into a circle with said channel opening inwardly for engagement with corresponding surfaces of a pair of members adapted to be forced into axial engagement by radial constriction of said band: a fastener engaging element mounted to each free end of said band; each element including a portion secured permanently to said band, an outwardly extending portion adapted to be engaged by a fastener, and an inwardly extending portion having an inner end face engaging said channel-shaped band adjacent its extremity to reinforce the band to prevent deformation thereof under load.

CLARENCE E. CHRISTOPHERSEN.

REFERENCES CITED

The following references are of record in the file of this patent:

UNITED STATES PATENTS

| Number | Name | Date |
| --- | --- | --- |
| 292,306 | Hawley | Jan. 22, 1884 |
| 711,946 | Day | Oct. 28, 1902 |
| 872,442 | Morris | Dec. 3, 1907 |
| 2,269,664 | Hallerberg | Jan. 13, 1942 |
| 2,271,425 | Harris | Jan. 27, 1942 |
| 2,426,423 | Woolsey | Aug. 26, 1947 |
| 2,490,640 | Lefevre-Selmer | Dec. 6, 1949 |